(12) United States Patent
Doretto et al.

(10) Patent No.: US 7,953,245 B2
(45) Date of Patent: May 31, 2011

(54) SYSTEM, METHOD AND PROGRAM PRODUCT FOR CAMERA-BASED OBJECT ANALYSIS

(75) Inventors: Gianfranco Doretto, Niskayuna, NY (US); Yi Yao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 84 days.

(21) Appl. No.: 12/542,994

(22) Filed: Aug. 18, 2009

(65) Prior Publication Data

US 2011/0044497 A1  Feb. 24, 2011

(51) Int. Cl.
*G06K 9/62* (2006.01)
(52) U.S. Cl. .................................... 382/103; 382/228
(58) Field of Classification Search .................. 382/103, 382/190, 217, 224, 228
See application file for complete search history.

(56) References Cited

U.S. PATENT DOCUMENTS

| | | | | |
|---|---|---|---|---|
| 6,801,661 B1 * | 10/2004 | Sotak et al. | ................... | 382/203 |
| 7,212,671 B2 | 5/2007 | Kim et al. | ..................... | 382/190 |
| 7,269,285 B2 | 9/2007 | Bober et al. | ................... | 382/190 |
| 2005/0238198 A1 * | 10/2005 | Brown et al. | .................. | 382/103 |
| 2007/0133878 A1 | 6/2007 | Porikli et al. | ................. | 382/190 |
| 2007/0286526 A1 | 12/2007 | Abousleman et al. | ........ | 382/284 |
| 2008/0063285 A1 * | 3/2008 | Porikli et al. | ................. | 382/190 |
| 2008/0187220 A1 | 8/2008 | Doretto et al. | ................ | 382/173 |

FOREIGN PATENT DOCUMENTS

WO    WO2006058154 A1    6/2006

* cited by examiner

*Primary Examiner* — Andrew W Johns
(74) *Attorney, Agent, or Firm* — Joseph J. Christian (57) ABSTRACT

A system, method and program product for camera-based object analyses including object recognition, object detection, and/or object categorization. An exemplary embodiment of the computerized method for analyzing objects in images obtained from a camera system includes receiving image(s) having pixels from the camera system; calculating a pool of features for each pixel; then deriving either a pool of radial moment of features from the pool of features and a geometric center of the image(s) or a pool of central moments of features from the pool of features; then calculating a normalized descriptor, based on an area of the image(s) and either of the derived pool of moments of features; and then based on the normalized descriptor, a computer then either recognizes, detects, and/or categorizes an object(s) in the image(s).

14 Claims, 3 Drawing Sheets

SYSTEM, METHOD AND PROGRAM PRODUCT FOR CAMERA-BASED OBJECT ANALYSIS

BACKGROUND OF THE INVENTION

The present invention relates generally to intelligent camera systems and more particularly to a system, method and program product that may employ camera systems to improve analyses of objects.

Camera surveillance systems are increasingly becoming more "intelligent" in that images and data obtained from these camera systems are increasingly analyzable independent (at least partially) of the need for human review and analysis of the camera-obtained data (i.e., video).

With any type of automated video analyses, various factors can negatively affect the ability to effectively recognize, detect, and/or categorize the object(s) in the video. Just some of the factors that can influence accurate and effective object analyses include the illumination of the scene, the scale of the scene, and the rotation of the camera(s).

Accordingly, there is an ongoing need for improvement in the "intelligence" of camera systems and object analysis, including the recognition, detection, and/or categorization of objects.

BRIEF DESCRIPTION

The present invention overcomes at least some of the aforementioned drawbacks in camera systems by improving upon the "intelligence" of the camera system. More specifically, the present invention is directed to a system, method, and program product for improving object analysis including object recognition, object detection, and object categorization.

Therefore, in accordance with one aspect of the invention, a computerized method for analyzing objects in images, wherein the images are obtained from a camera system, said computerized method comprises: receiving at least one image having a plurality of pixels from the camera system; calculating a pool of features for each pixel of the plurality of pixels; deriving one of: a pool of radial moment of features from the pool of features and a geometric center of the at least one image; and a pool of central moments of features from the pool of features; calculating a normalized descriptor, based on an area of the at least one image and one of the derived pool of radial moment of features and the derived pool of central moments of features; and based on the normalized descriptor, a computer then at least one of: recognizing at least one object in the at least one image; detecting at least one object in the at least one image; and categorizing at least one object in the at least one image.

In accordance with another aspect of the invention, a computerized method for analyzing objects in images, wherein the images are obtained from a camera system, said computerized method comprises: receiving at least one image having a plurality of pixels from the camera system; calculating a pool of features for each pixel of the plurality of pixels; deriving a pool of central moments of features from the pool of features; computing a pool of central moment invariants, based on the pool of central moments of features; calculating a normalized descriptor, based on an area of the at least one image and the pool of central moments of features; and based on the normalized descriptor, a computer then at least one of: recognizing at least one object in the at least one image; detecting at least one object in the at least one image; and categorizing at least one object in the at least one image.

In accordance with another aspect of the invention, a computer readable medium having computer executable instructions providing a method for analyzing objects in images, wherein the images are obtained from a camera system, said method comprises: receiving at least one image having a plurality of pixels from the camera system; calculating a pool of features for each pixel of the plurality of pixels; deriving one of: a pool of radial moment of features from the pool of features and a geometric center of the at least one image; and a pool of central moments of features from the pool of features; calculating a normalized descriptor, based on an area of the at least one image and one of the derived pool of radial moment of features and the derived pool of central moments of features; and based on the normalized descriptor, at least one of: recognizing at least one object in the at least one image; detecting at least one object in the at least one image; and categorizing at least one object in the at least one image.

In accordance with another aspect of the invention, a system for analyzing objects in images, wherein the images are obtained from a camera system, said system comprising: a system for receiving at least one image having a plurality of pixels from the camera system; a system for calculating a pool of features for each pixel of the plurality of pixels; a system for deriving one of: a pool of radial moment of features from the pool of features and a geometric center of the at least one image; and a pool of central moments of features from the pool of features; a system for calculating a normalized descriptor, based on an area of the at least one image and one of the derived pool of radial moment of features and the derived pool of central moments of features; and a system that, based on the normalized descriptor, does at least one of: recognizing at least one object in the at least one image; detecting at least one object in the at least one image; and categorizing at least one object in the at least one image.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Aspects of the present invention offer advantages over previous systems that employ camera systems. The system, method, and program product is able to analyze objects (e.g., vehicles, people, etc.) in data (e.g., video, images, image regions, etc.) gained from camera systems more effectively. Improvements under aspects of the present invention include the ability to detect objects, categorize objects, and/or recognize objects more readily, with respect to noise and image transformations (e.g., illumination variation, camera rotation variation, scale variation, etc.). The "intelligence" of the camera system employing aspects of the invention is effectively increased.

Aspects of the present invention include the ability to more efficiently analyze objects including, for example, detect objects, categorize objects, and/or recognize objects. The object that may be analyzed under embodiments can be virtually any thing obtained from a camera system including vehicles, people, and the like.

Object detection includes the ability to determine a quantity of objects belonging to a particular class are present in the image; where in the image are the object(s) in the particular class; and/or what is an approximately size of the object(s) in the image. For example, given a single image, object detection may include detecting an object that belongs in a given class (e.g., the class of all possible vehicles).

Object categorization includes the ability to determine which of N classes of objects the detected object belongs to. For example, suppose there are N classes of detectable objects (e.g., N=3, wherein one class is of all SUV's, another class is all sedans, and the third class is all trucks). Thus, given a single image, object categorization includes being able to categorize which of the N classes the detected object belongs in. For example, given an image containing a vehicle, object categorization includes being able to determine whether the vehicle is an SUV, a sedan, or a truck.

Object recognition includes the ability to determine if the detected object is the same specific object from a collected library of images of objects. For example, given a new image containing an object, object recognition includes recognizing whether or not the object contained in the image depicts the same specific object that preexists in the collect library. For example, in the vehicle context, suppose there is a specific owner's SUV (e.g., 2005, dark blue, Honda Element EX having a roof rack) that the user seeks to recognize. Object recognition includes being able to adequately determine whether in the received image(s) that specific owner's SUV exists in the image(s), based on the collected library of images of objects (e.g., vehicles). The object recognition could include the ability to recognize, for example the owner's 2005, dark blue, Honda Element EX having a roof rack, in the image(s) even if the image library includes, for example, images of other vehicles having the same attributes (e.g., 2005 model; dark blue; SUV; Honda make; Element model; Element EX model; and the like). Object recognition includes recognizing that the image(s) does (or does not) contain a specific object that is contained in the collected library, regardless of class of the object or object categorization.

Aspects of the present invention include a new class of appearance descriptors based on the idea of image moments applied to a pool of image features. By a careful design of the image moments, and the image features, the descriptors can be made scale and rotation invariant, as well as robust to illumination changes. Aspects include fast procedures for their computation, which are based on integral representation. Their invariance properties make them suitable, for example, for the application of vehicle detection from aerial video, where scale and rotation invariance are often critical.

The design of appearance descriptors has received a considerable amount of attention during the last decade. This is because many practical applications require the computation of descriptors for supporting tasks that range from image feature matching to object matching, or that range from object detection to object category recognition. An important property of a descriptor is its distinctiveness, but another issue is its robustness with respect to noise and image transformations, due to both illumination and viewpoint variations. The computational complexity of a descriptor is also a major property. This may become an issue during the training phase (e.g., feature selection), as well as at runtime. In fact, almost every task entails the computation of large amounts of statistics (i.e., appearance descriptors) from data that correspond to several image regions. Aspects of the present invention introduce a class of new descriptors addressing the issues of computational efficiency, invariance to scale and rotation transformations, and the like.

Aspects of the present invention introduce moments of image features, which enables the design of a map from the image space to the space of, where every pixel is assigned to an image feature vector, containing the desired local description of the image. Aspects of the invention address rotation invariance and provides a new pool of isotropic features.

Embodiments of the invention include the use of three different appearance descriptors. The descriptors are all scale invariant, and they can be rotation invariant, depending on the isotropic properties of the image features. In any event, the first appearance descriptor computes the central moments of the image features of a given region. The second appearance descriptor is a set of invariants computed over every image feature. The third appearance descriptor computes the radial moments of the image features.

Computational efficiency is addressed under aspects of the invention by designing procedures that extend the use of the integral image representation to the computation of moments of image features. For a given image, this enables the computation of new descriptors in constant time, modulo the pre-computation of a number of quantities.

Aspects of the present invention include a new class of descriptors that focus on the problem of invariance to scale and rotation, for which is developed a new set of image features. Aspects also include new procedures that enable the computation of descriptors in constant time. This is obtained after a pre-computation phase, with cost that scales linearly with the dimensionality of the image features, and not quadratically.

An embodiment of the present invention addresses the problem of vehicle detection from aerial video. The descriptors outperform prior art methodologies, as they are the most efficient while used in conjunction with a classifier, such as a support vector machine (SVM).

Moments of Image Features:

Image features and moments of image features are defined as disclosed herein.

Let I be either a monochromatic, or an RGB image, defined for every $(x, y) \in \Omega \subset \mathbb{R}^2$ $\Phi$ is a generic filtering operation that maps I, and the pixel $(x, y)$, to the d dimensional image feature vector $$f(x, y) = [f_1(x, y), \ldots, f_d(x, y)]^T = \Phi(I, x, y), \quad (1)$$

A rotation of the image I is operated around the pixel $(x, y)$. If $f_i(x, y)$ has not changed based upon the rotation, it is an isotropic feature. Otherwise, $f_i$ is anisotropic. For instance, $I_x = \partial I / \partial x$ is an anisotropic feature, whereas the magnitude of the image gradient $|\nabla I|$ is an isotropic feature. The set of all moments are the projection of the image features onto the space of polynomials with two variables.

With $m_{pq}$, where p and q are non-negative integers, the moment of the image features f of order $n = p + q$, is defined as $$m_{pq} = \int_\Omega x^p x^q f(x, y) dx dy \quad (2)$$

Note that all the definitions of moments heretofore regard the image features as probability densities. Under aspects of the present invention, however, image features are not treated as probability densities. As long as the $\{f_i\}$ are piecewise continuous, and have bounded support, then moments of all orders exist, and are uniquely determined. In all practical cases these conditions are widely satisfied.

Aspects of the present invention also introduce the notation $m_n \doteq [m_{0n}^T, \ldots, m_{n0}^T]^T$, which refers to the ordered stack of the n+1 moments of order n.

Similarly, $\mu_{pq}$ is the central moments of the image features f of order n=p+q≧2, with components $\mu_{pq,i}$ and is defined as $$\mu_{pq,i} = \int_\Omega \left(x - \frac{m_{10,i}}{m_{00,i}}\right)^p \left(y - \frac{m_{01,i}}{m_{00,i}}\right)^q f_i(x,y) dx dy. \quad (3)$$

The notation $\mu_n \doteq [\mu_{0n}^T, \ldots, \mu_{n0}^T]^T$ refers to the ordered stack of the n+1 central moments of order n.

From $\mu_2$ and $\mu_3$, it is possible to extract seven different statistics (known as the Hu's invariants) that are invariant to translations and rotations of the features f. They are indicated as $\tau_1, \ldots, \tau_7 \in \mathbb{R}^d$, and they are vectors with components defined as follows $\tau_{1,i} = \mu_{20,i} + \mu_{02,i}$, $\tau_{2,i} = (\mu_{20,i} - \mu_{02,i})^2 + 4(\mu_{11,i})^2$, $\tau_{3,i} = (\mu_{30,i} - 3\mu_{12,i})^2 + (3\mu_{21,i} + \mu_{03,i})^2$, $\tau_{4,i} = (\mu_{30,i} + \mu_{12,i})^2 + (\mu_{21,i} + \mu_{03,i})^2$, $\tau_{5,i} = (\mu_{30,i} - 3\mu_{12,i})(\mu_{30,i} + \mu_{12,i})[(\mu_{30,i} + \mu_{12,i})^2 - 3(\mu_{21,i} + \mu_{03,i})^2] + (3\mu_{21,i} + \mu_{03,i})(\mu_{21,i} + \mu_{03,i})[3(\mu_{30,i} + \mu_{12,i})^2 - (\mu_{21,i} + \mu_{03,i})^2]$, $\tau_{6,i} = (\mu_{20,i} - \mu_{02,i})[(\mu_{30,i} + \mu_{12,i})^2 - (\mu_{21,i} + \mu_{03,i})^2] + 4\mu_{11,i}(\mu_{30,i} + \mu_{12,i})(\mu_{21,i} + \mu_{03,i})$, $\tau_{7,i} = (3\mu_{21,i} - 3\mu_{03,i})(\mu_{30,i} + \mu_{12,i})[(\mu_{30,i} + \mu_{12,i})^2 - 3(\mu_{21,i} + \mu_{03,i})^2] - (3\mu_{30,i} + \mu_{12,i})(\mu_{21,i} + \mu_{03,i})[3(\mu_{30,i} + \mu_{12,i})^2 - (\mu_{21,i} + \mu_{03,i})^2]$. (4)

The radial moment of the image features f of order n≧1 is defined as $$m_n \doteq \int_\Omega [(x - \bar{x}_\Omega)^2 + (y - \bar{y}_\Omega)^2]^n f(x,y) dx dy \quad (5)$$

where $(\bar{x}_\Omega, \bar{y}_\Omega) \in \mathbb{R}^2$, represents the geometric center of the domain Ω. These moments have the fundamental property of being invariant to rotations of the features f.

Appearance Descriptors:

$D \subset \Omega$ is a simply connected domain, wherein |D| indicates the area of the domain. For an appearance descriptor an operator that maps the image features $\{f(x,y)|(x,y) \in D\}$ to a descriptor vector $y \in \mathbb{R}^J$ is intended. Under aspects of the present invention, three appearance descriptors based on the moments of image features discussed herein are defined as follows.

Central Moment (CM) Descriptor:

From the set of central moments of the image features $\{\mu_i\}$, computed over the domain D, the central moment descriptor of order n≧2 is defined as the vector $$y_{CM} \doteq \left[\frac{\mu_2^T}{|D|^2}, \ldots, \frac{\mu_n^T}{|D|^{\frac{n+2}{2}}}\right]^T \quad (6)$$

with $$J_{CM} = \frac{n^2 + 3n - 4}{2} d$$

components.

Central Moment Invariant (CMI) Descriptor:

From the set of central moment invariants of the image features $\{\tau_i\}$, computed over the domain D, the central moment invariant descriptor is defined as $$y_{CMI} \doteq \left[\frac{\tau_1^T}{|D|^2}, \frac{\tau_2^T}{|D|^4}, \frac{\tau_3^T}{|D|^5}, \frac{\tau_4^T}{|D|^5}, \frac{\tau_5^T}{|D|^{10}}, \frac{\tau_6^T}{|D|^7}, \frac{\tau_7^T}{|D|^{10}}\right]^T \quad (7)$$

which is a vector with $J_{CMI} = 7d$ components.

Radial Moment (RM) Descriptor:

From the set of radial moments of the image features $\{m_i\}$, computed over the domain D, the radial moment descriptor of order n≧1 is defined as $$y_{RM} \doteq \left[\frac{m_1^T}{|D|^2}, \ldots, \frac{m_n}{|D|^{n+1}}\right]^T \quad (8)$$

which is a vector with $J_{RM} = nd$ components.

Region Covariance (RC) Descriptor:

In testing the viability of the aforementioned three appearance descriptors, the following region covariance (RC) descriptor was used as a comparison. The covariance matrix of the image features f of the region D is defined as $$k_f = \frac{1}{|D|} \int_D (f(x,y) - \bar{f})(f(x,y) - \bar{f})^T dx dy, \quad (9)$$

where $\bar{f} = m_{00}/|D|$ is the average image feature vector over D. Given that $k_f$ is a symmetric positive definite matrix, the region covariance descriptor is given by the vector $y_{RC}$ containing the $J_{RC} = (d^2 + d)/2$ independent entries of $k_f$.

Appearance Descriptor Properties:

All the four descriptors can provide an effective, and very low dimensional representation of the image, especially RM. In contrast, even the widely used representation of image features with a joint histogram would give rise to a descriptor with dimensionality $O(d^\alpha)$, with α~O.

In CM, CMI, and RM the image features are seen as probability distributions, and the descriptors summarize how the features are distributed over the domain of computation. In RC the image features are seen as a random vector, and the descriptor is its covariance. If the features contain spatial information, then RC correlates this information with the other features.

All the descriptors provide a suitable way to fuse the information of multiple features. While RC does that by intrinsically computing the correlations between each pair of image features, CM, CMI, and RM enable that by setting some image features to be the combination of others. Under aspects of the present invention the dimensionality of the three new descriptors (i.e., CM, CMI, RM) scales linearly with d, rather then quadratically, like in RC.

Supposing at a given instant, D contains an object over a uniform background, and at a subsequent instant, the object has translated but is still inside D. All the descriptors are invariant to such a translation with the exception of RM, which is computed relative to the geometric center of D. As such, RM may be a better descriptor for localizing a specific object.

Provided that the features at every pixel encode information that is scale invariant, the normalization with respect to |D| operated on equations 6, 7, 8 and 9, make all the descriptors scale invariant. Notice, however, that even without features that are completely scale invariant, it is possible to achieve a very high degree of invariance with respect to scale.

As such, the following facts result: (a) if the image features $\{f_i\}$ are all isotropic, CMI, RM, and RC are rotation invariant; (b) if some of the $\{f_i\}$ are anisotropic, CMI, RM, and RC are not rotation invariant; (c) regardless of the nature of the $\{f_i\}$, CM is not rotation invariant. Thus, depending on the application, rotation invariance (variance) may or may not be a requirement.

All the descriptors delegate the illumination invariance issue to the design of the image features. RC is also invariant to illumination changes that cause an additive variation to the features, because the mean features are removed from the descriptor computation.

Image Feature Sets:

Under aspects of the present invention, filtering operations may be used to produce the set of image features. For example, two sets of filters: $\Phi_A$, and $\Phi_I$ may be used, wherein $\Phi_A$ is a set of anisotropic features and $\Phi_I$ is a set of isotropic features.

The set of filters $\Phi_A$ is such that the image features are computed as $$f(x,y) \doteq [x, y, R(x, y), G(x, y)B(x, y), |I_x(x, y)|, |I_y(x, y)|, |I_{xx}(x, y)|, |I_{yy}(x, y)|]^T, \quad (10)$$

where R, G, and B are the RGB color channels of the image I, and the other quantities are the magnitude of the first and second order partial derivatives of the image intensity. This is neither an illumination nor a scale invariant set of features. Finally, x and y are present only when the RC descriptor is computed.

The set of filters $\Phi_I$ is defined such that the image features are computed as $$f(x,y) \doteq [\rho_\Omega^2, R(x, y), G(x, y)B(x, y), |\nabla I(x, y)|, \kappa_\rho(x, y), \kappa_\theta(x, y), s(x, y)]^T, \quad (11)$$

where $\rho_\Omega^2 \doteq (x-\bar{x}_\Omega)^2 + (y-\bar{y}_\Omega)^2$, the RGB color channels, and the magnitude of the gradient of the image intensity. As before, $\rho_\Omega$ is present only when the RC descriptor is computed. The last three features are shape parameters, and give a local description of the 3D shape generated by the image intensity, i.e., $\{(x, y, z) \in \mathbb{R}^3 | I(x, y) + z = 0\}$. $\kappa_\rho$ and $\kappa_\theta$ are the representation in polar coordinates of the principal curvatures $\kappa_1$ and $\kappa_2$, whereas s is the shape index, which is also scale invariant. They can be computed with a fast procedure are defined as follows $$\kappa_\rho = \sqrt{\kappa_1^2 + \kappa_2^2}, \quad (12)$$

$$\kappa_\theta = \arctan\left(\frac{\kappa_2}{\kappa_1}\right), \quad (13)$$

$$s = \frac{2}{\pi}\arctan\left(\frac{\kappa_2 + \kappa_1}{\kappa_2 - \kappa_1}\right). \quad (14)$$

$\Phi_I$ is not an illumination invariant set of features. Increased illumination robustness is gained by replacing the RGB channels with the Laplacian of the logarithm of the respective channels, and the intensity by its logarithm. Any derivative after the logarithm cancels out multiplicative illumination changes, and significantly reduces additive ones. Successful experiments with these modifications have been conducted.

Fast Algorithms Via Integral Representation:

An image I, defined over $\Omega$, its integral representation, is known as an integral image and is given by $$\int_{u \leq c, v \leq y} I(u, v) du dv.$$

This representation allows to compute the integral of the image over any rectangular domain D with an O(1) number of operations. Note that the area of D=[x', x"]×[y', y"] can be computed as $|D|=A(x', y')-A(x", y')+A(x", y")-A(x", y")$ where $$A(x, y) \doteq \int_{u \leq x, v \leq y} du dv,$$

which can be conveniently precomputed. This representation may be used to derive fast algorithms for computing the CM, CMI, and RM descriptors.

CM Descriptor:

In order to compute $y_{CM}$ the set of moments $\{\mu_{pq} | p+q=2, \ldots, n\}$ may be used. The binomial theorem allows to relate moments to central moments as follows $$\mu_{pq,i} = \sum_{j=0}^{p}\sum_{k=0}^{q}\binom{p}{qk}\binom{q}{k}\left(-\frac{m_{10,i}}{m_{00,i}}\right)^{p-j}\left(-\frac{m_{01,i}}{m_{00,i}}\right)^{q-k} m_{jk,i}. \quad (15)$$

Therefore, the central moments can be computed from the set of moments $\{m_{pq} | p+q=0, \ldots, n\}$. In turn, the moments can take advantage of the integral representation by defining the following function $$M_{pq}(x, y) \doteq \int_{u \leq x, v \leq y} u^p v^q f(u, v) du dv, \quad (16)$$

and the moment over D can be computed as follows $$m_{pq} = M_{pq}(x', y') - M_{pq}(x", y') + M_{pq}(x", y") - M_{pq}(x', y"). \quad (17)$$

Note that the quantity $u^p v^q$ in equation (16) can be conveniently precomputed. Finally, the entire computation involves the initial formation of $$\frac{n^2 + 3n + 2}{2}d$$

integral representations for equation (16), each of which can be computed with one pass over the domain $\Omega$, and then each descriptor is obtained with constant computational complexity of $O(n^2 d)$ operations.

CMI Descriptor:

In order to compute $y_{CMI}$ the central moments $\mu_2$, and $\mu_3$ are needed and may be computed with the procedure described above, from which one can compute the set of invariants $\{\tau_i\}$. The entire computation involves the initial formation of 10d integral images, and then each descriptor is obtained with constant computational complexity of O(d) operations.

RM Descriptor:

In order to compute $y_{RM}$ we need $m_1, \ldots, m_n$. The binomial theorem allows to relate moments to radial moments as $$m_{pq} = \sum_{i=0}^{n} \sum_{j=0}^{2n-ni} \sum_{k=0}^{2i} \binom{n}{i}\binom{2n-2i}{j}\binom{2i}{k} \bar{x}_D^{2n-2i-j} \bar{y}_D^{2i-k} m_{jk}. \quad (18)$$

where $$\bar{x}_D = -\frac{x' + x''}{2}, \text{ and } \bar{y}_D = -\frac{y' + y''}{2}.$$

Therefore, the radial moments can be computed from $\{m_{pq} | p+q\ 0, \ldots, 2n\}$, which in turn can be computed as explained above. The entire computation involves the initial formation of $(2n^2+2n+1)d$ integral representations for Equation (16), and then each descriptor is obtained with constant computational complexity of O(nd) operations.

TABLE 1

| Descriptor | Length | Passes | Operations |
|---|---|---|---|
| RC | $\dfrac{d^2 + d}{2}$ | $\dfrac{d^2 + 3d}{2}$ | $O(d^2)$ |
| CM | $\dfrac{n^2 + 3n - 4}{2}d$ | $\dfrac{n^2 + 3n + 2}{2}d$ | $O(n^2d)$ |
| CMI | 7d | 10d | O(d) |
| RC | nd | $(2n^2 + 2n + 1)d$ | O(nd) |

Table 1 offers a summary of the descriptor lengths, number of integral representation to be computed (passes), and order of the number of operations per descriptor, as functions of the number of image features d, and of the descriptor order n.

Table 1 summarizes the main computational characteristics of the four descriptors. It is noted that n=2 or 3 may be enough to obtain a powerful descriptor. With n fixed, the number of integral representations to be computed is $O(d^2)$ for the RC descriptor, whereas it is O(d) for the other three descriptors. The same holds for the number of operations for computing one descriptor after the precomputation phase, which is $O(d^2)$ for the RC descriptor, and O(d) for all the others. Note also that, with n being so small, the RM descriptor is very short.

Experiments:

Experiments were conducted to analyze the performance of the RC descriptor, the CM descriptor of order 3, the CMI descriptor, and the RM descriptor of order 2, in combination with anisotropic, $\Phi_A$, and isotropic, $\Phi_I$, image features. The testbed application was vehicle detection from aerial video. A sliding window approach was adopted where at every pixel a descriptor over a squared image area is computed at 5 different scales, and feeds an SVM classifier, which outputs a score. Morphological filtering and connected components were then computed over the thresholded scores in support of arbitrating the vehicle scale, and establishing a detection.

In all the experiments where the CM, CMI, and RM descriptors are used an SVM classifier is deployed. In all experiments where the RC descriptor is used, a SVM with kernel $(-\gamma d(y, y')^2)$ is deployed, where $d(y, y')$ is the metric for positive definite covariance matrices which takes into account the curvature of the associated manifold. The experiments also proved that the simple linear SVM would be suboptimal, given the known structure of the space of covariance matrices. The constant y is optimized by trial and error.

Figure 2A:
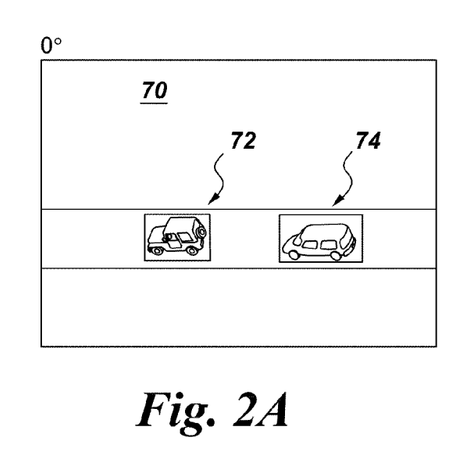
FIGS. 2A-2D are images of aerial views of various rotation angles that are employable by a system according to an embodiment of the present invention.
Figure 2B:
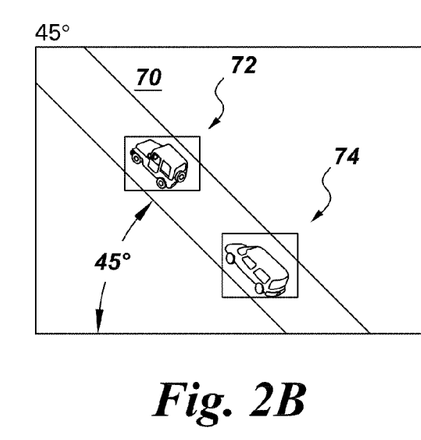
Figure 2C:
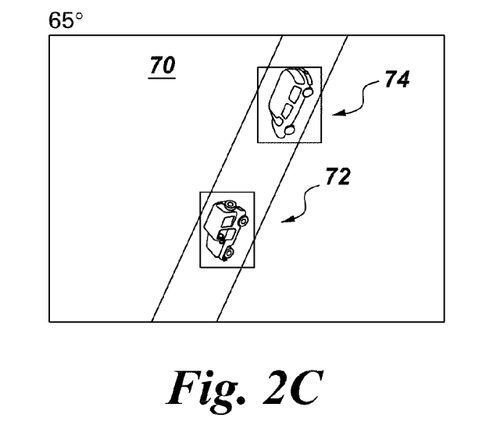
Figure 2D:
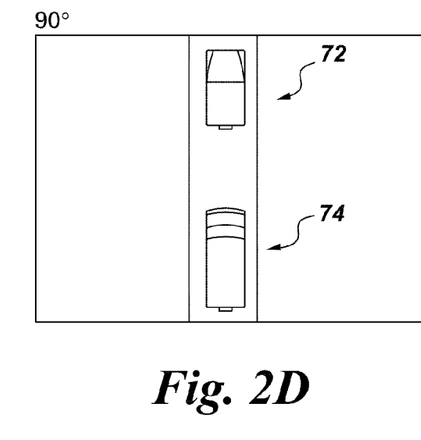

A dataset made of sequences of highway traffic collected from a camera mounted at various rotation angles was used. In particular, the sequences were collected with the camera rotated at 0°, 20°, 35°, 65°, and 90°. See e.g., FIGS. 2A-2D which depict images of aerial views obtained and rotated at various angles (e.g., 0° in FIG. 2A, 45° in FIG. 2B, 65° in FIG. 2C, and 90° in FIG. 2D.) For each video, the ground-truth vehicle locations, and sizes, were manually annotated by recording the rectangular regions of interest (ROIs) around each vehicle moving along the highway, resulting in a total of about 47000 different ROIs, corresponding to 590 different vehicles. The sizes of the ROIs vary from about 30×20 to 120×40 pixels, depending on the type of the vehicle.

For every descriptor the receiver operating characteristic (ROC) curve of the classifier output was provided, corresponding to the positive and negative labeled samples, (i.e., ROIs containing or not containing a vehicle, respectively). Since for every sample the camera rotation is known, it is possible to draw multiple ROC curves, corresponding to each rotation angle. For every descriptor of choice, the ROC curve evaluated over all camera rotations is provided, and also added the one-standard-deviation upper and lower limits that express how much variation can be expected due to rotation.

From the sequence rotated at 0° the positive and negative samples with 5-fold cross-validation was used. Moreover, validation is conducted by adding to the testing group synthetically rotated samples, with rotations uniformly sampled in the range between 0° and 180°, with an interval of 20°.

Regardless of the features, the CM descriptor is very sensitive to rotation, which is in line with its theoretical properties. The RC descriptor is very sensitive to rotation when it uses anisotropic features, and becomes invariant with isotropic ones, with a significant performance increase. Again, this is in line with its properties. The CMI and RM descriptors are the best performers, regardless of the features. They improve by switching from $\Phi_A$ to $\Phi_I$, and they show limited sensitivity to rotation variation, even though they are not rotation invariant when $\Phi_A$ is used.

The performance of the CMI descriptor for the following pools of features: $\Phi_C \doteq [R, G, B]^T$, $\Phi_g \doteq [|I_x|, |I_x|, |I_{xx}|, |I_{yy}|]^T$, $\Phi_A = [\Phi_c^T \Phi_g^T]^T$, $\Phi_s \doteq [|\nabla I|, \kappa_\rho, \kappa_\Theta, s]^T$ and $\Phi_I = [\Phi_c^T \Phi_s^T]^T$ was analyzed. $\Phi_c$ is isotropic, which makes CMI and RM rotation invariant, and that explains their good performance. In contrast, $\Phi_g$ is anisotropic, which explains the poorer performance, and greater sensitivity to rotation. When $\Phi_C$ is augmented with $\Phi_g$ to form $\Phi_A$, neither a significant performance improvement nor a deterioration is observed. This explains the relatively good performance of CMI and RM, which is due to the dominance of the R, G, and B image features. When $\Phi_I$ is decomposed, notice that $\Phi_s$ is isotropic, thus CMI and RM are rotation invariant, and with performance that even exceeds the case of $\Phi_c$. Therefore, when $\Phi_c$ is augmented with $\Phi_s$ to form $\Phi_I$, the best performance is obtained. This analysis highlights the importance of the addition of the pool of features $\Phi_s$, which has proved to be more effective than the addition of $\Phi_g$.

From the sequence rotated at 0° the positive and negative samples for training were used, and the samples from the sequences rotated at 20°, 45°, 65°, and 90°, were used for testing. This is a more challenging scenario because validation is done with real rotated image data, which include new sources of noise that will affect the descriptor computation.

The descriptors generally behave exactly as they did for the case of synthetically rotated testing samples, with an increase in sensitivity to camera rotation. In particular, there is a clear deterioration of the average performance of the RC descriptor, even with isotropic features. Finally, CMI with isotropic features seems to undergo only a slight performance drop, whereas the RM appears to be the most immune to this synthetic-to-real-data switch.

From the sequence rotated at 0° the positive and negative samples were used, together with the positive and negative synthetically rotated samples, for training, and the samples from the sequences rotated at 20°, 45°, 65°, and 90°, were used for testing.

With $\Phi_A$ every descriptor improves the performance, notably RC, and CM even more. This was expected, given their sensitivity to camera rotation, which is now smoothened by a richer training dataset. With $\Phi_I$ CM improves significantly. Since RC, CMI, and RM are supposed to be rotation invariant, their performance undergo only a minor change. Overall, even with a training that includes every possible rotation, the CM and RC descriptors are outperformed by the CMI descriptor, and even more by the RM descriptor.

TABLE 2

| Descriptor | Length | (a) | (b) | (c) |
|---|---|---|---|---|
| Anisotropic image features | | | | |
| RC | 45 | 0.556 ± 0.298 | 0.719 ± 0.456 | 0.840 ± 0.157 |
| CM | 49 | 0.505 ± 0.455 | 0.640 ± 0.506 | 0.960 ± 0.106 |
| CMI | 49 | 0.974 ± 0.012 | 0.966 ± 0.074 | 0.974 ± 0.043 |
| RM | 14 | 0.981 ± 0.006 | 0.982 ± 0.046 | 0.988 ± 0.024 |
| Isotropic image features | | | | |
| RC | 36 | 0.981 ± 0.001 | 0.830 ± 0.099 | 0.851 ± 0.082 |
| CM | 49 | 0.505 ± 0.388 | 0.647 ± 0.501 | 0.986 ± 0.040 |
| CMI | 49 | 0.993 ± 0.002 | 0.979 ± 0.022 | 0.981 ± 0.024 |
| RN | 14 | 0.983 ± 0.006 | 0.994 ± 0.013 | 0.995 ± 0.006 |

Table 2 shows the Area under ROC and a comparison between RC, CM, CMI, and RM descriptors. As a comprehensive performance parameter, Table 2 provides the area under the ROC curve, $A_{ROC}$, with the corresponding standard deviation due to camera rotation, $\sigma_{A_{ROC}}$ (i.e., $A_{ROC} \pm \sigma_{A_{ROC}}$). A higher $A_{ROC}$ suggests a higher true positive rate at the same false positive rate, and therefore better performance. The table confirms that the CMI, and (even more) the RM descriptors with isotropic features are the best performers.

The classifier was trained only with samples from the sequence rotated at 0°. Due to space constraints, the results only for the RC, the CMI, and the RM descriptors with isotropic features are shown. The images convey the superior robustness of the RM descriptor with respect to camera rotation. Note that only the vehicles on the highway are detected, and this is because, in the training sequence, the area outside of the highway was used to produce negative samples. Note that the use of linear SVMs provides a 10-fold speed-up improvement, during both training and testing, if compared to the SVM used for the RC descriptor, which requires the computation of the geodesic distance between covariance matrices.

Note that although FIGS. 2A-2D show images coming from static cameras, the detector does not exploit motion information, and can be used when the camera is moving, without the need for video registration.

Finally, in this work invariances have been treated in two ways: (a) by incorporating them in the descriptor design, and (b) by incorporating them into the SVM by generating artificially transformed samples. It is discovered (a) to be more effective then (b).

It reduces the burden of collecting training data from different viewpoints, reduces the amount of data handling, and, meanwhile, produces robust performances independently of changes in viewpoint.

Aspects of the present invention present a new class of appearance descriptors, which are based on the idea of image moments, applied to a collection of image features. By a careful design of moments and image features it is possible to engineer scale and rotation invariant appearance descriptors, which can also be made robust to illumination variations. The integral representation is exploited to design fast procedures to compute these descriptors, and found out that they have attractive computational complexity properties. By nature the descriptors live in a space where Euclidean geometry and linear classifiers are sufficient to effectively exploit them for classification purposes. Extensive experimentation was carried out to establish which descriptor is the most robust to scale and rotation variations, and found out that the best one, which is based on radial moments, significantly outperforms the popular region covariance descriptor for vehicle detection in aerial video. The class of descriptors under aspects of the present invention can become an effective building block in many other applications, such as real-time people detection, and object category recognition.

Figure 1:
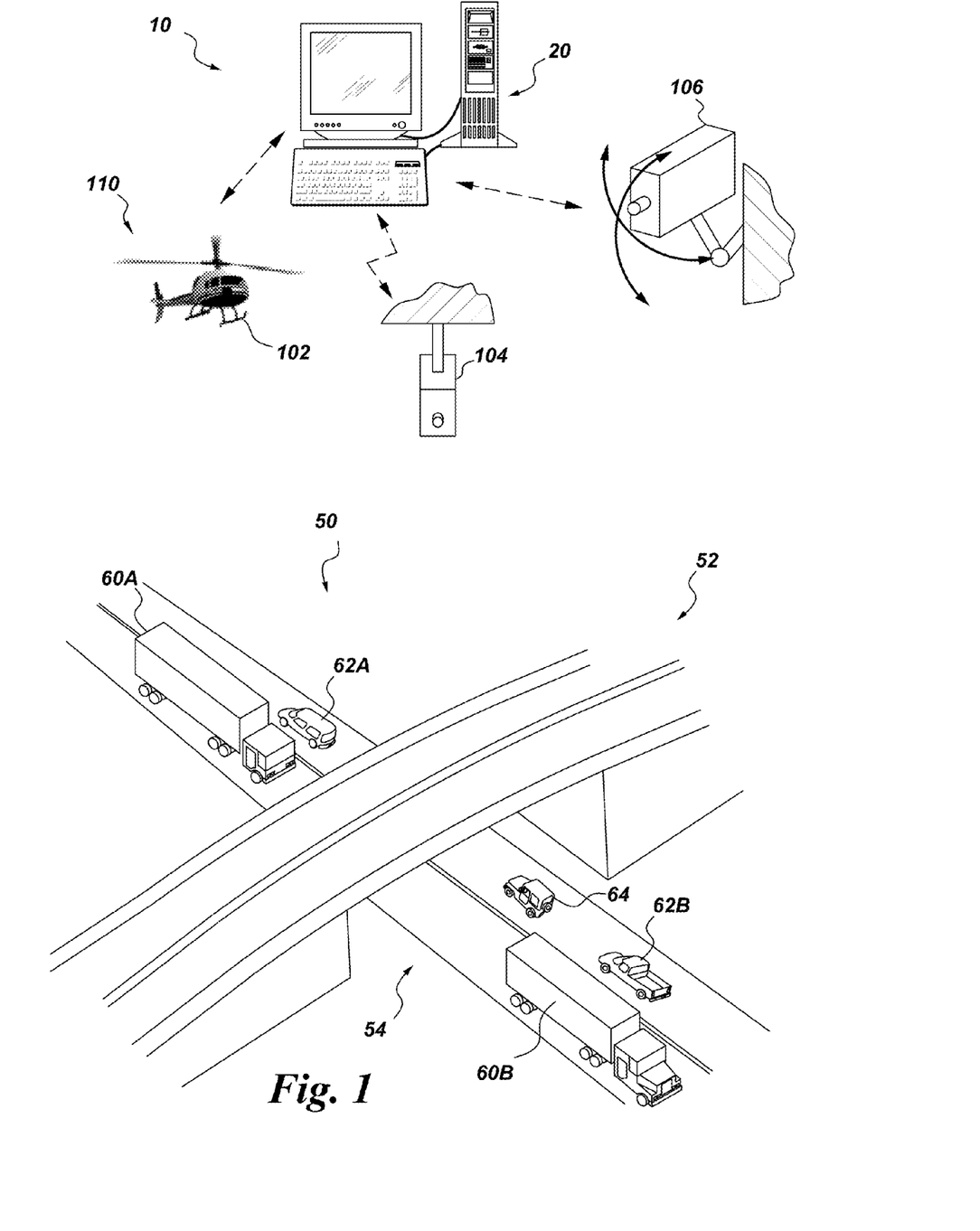
FIG. 1 is a schematic diagram of a system for analyzing camera-based objects incorporating aspects of the present invention.

Referring to FIG. 1 a high-level schematic diagram of a system for analyzing objects, or system 10, in accordance with embodiments of the present invention is shown. The system 10 includes a computer 20 that interacts with and receives a plurality of images from a camera system 110. In an embodiment, the camera system 110 may include at least one aerial camera (e.g., affixed to helicopter, etc.) 102, at least one fixed or still camera 104, and at least one pan-tilt-zoom (PTZ) camera 106. The quantity and type of camera(s) depicted in the camera system 110 is not meant to be limited under the invention. Clearly, other quantities, types, locations may be employed under aspects of the invention.

Figure 3:
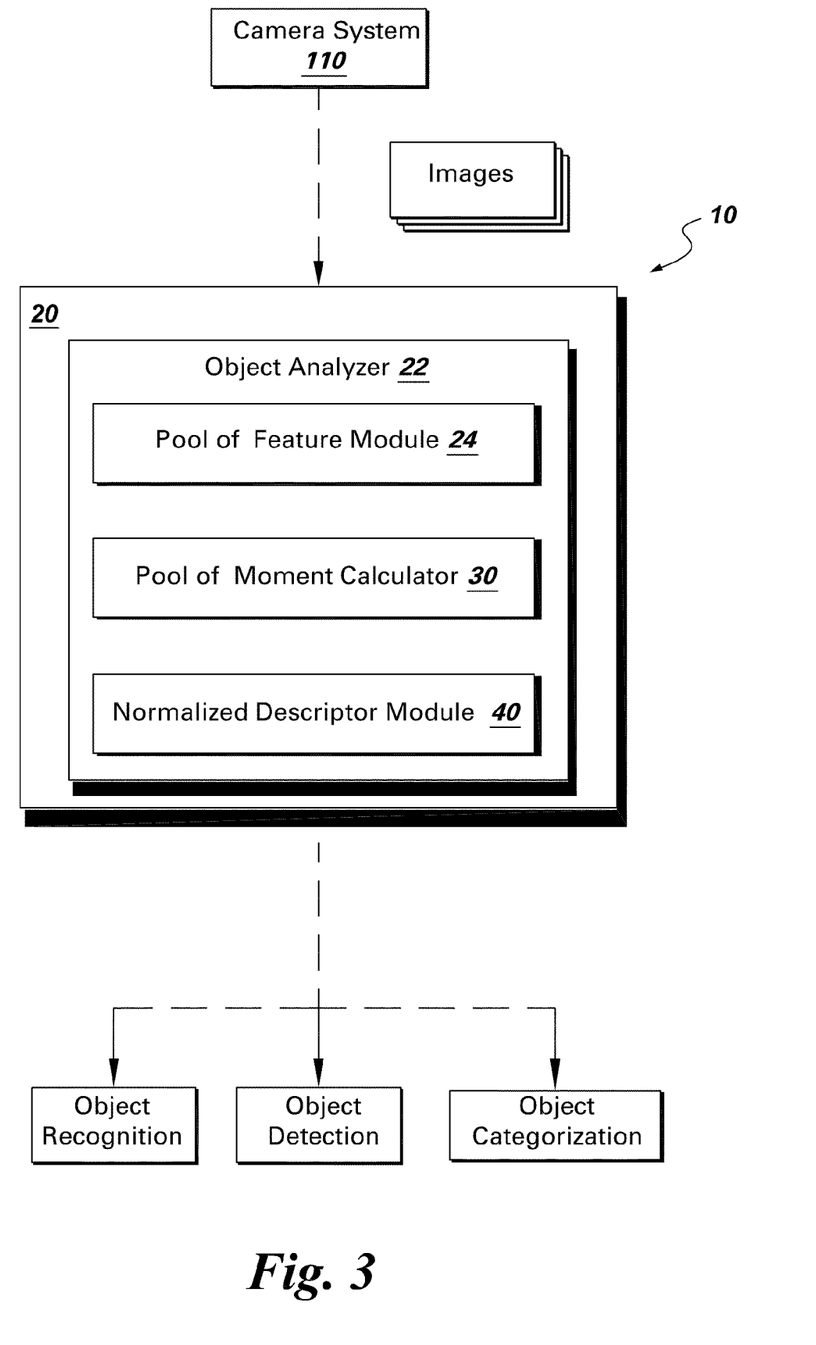
FIG. 3 is a schematic diagram of a system for analyzing camera-based objects incorporating aspects of the present invention.

Referring to FIGS. 1 and 3 the system 10 and its computer 20 is able to ultimately analyze objects in images received from the camera system 110. Each of the images comprises a plurality of pixels. The image may comprise one or more image regions.

The computer 20 comprises an object analyzer 22 for recognizing, detecting, and/or categorizing one, or more, object (s) in the received images, or image regions. The object analyzer 22 may comprise a pool of feature module 24, a pool of moment calculator 30 and a normalized descriptor module 40.

As shown in FIG. 3, the object analyzer 22 in the computer 20 receives at least one image having a plurality of pixels from the camera system 110. The object analyzer 22 will ultimately find or calculate at least one of the RM, CMI, and/or the CM in arriving at analyzing the object(s) in the image(s).

If the object analyzer 22 is calculating RM, after receiving the image(s) from the camera system 110, the pool of feature module 24 then calculates a pool of features for each pixel of the plurality of pixels in the image(s). The object analyzer 22 calculates a geometric center of the image(s), as well. The pool of moment calculator 30 derives a pool of radial moment of features from the pool of features and the calculated geometric center. The normalized descriptor module 40 then calculates a normalized descriptor based on the derived pool of radial moment of features, as shown in Equation 8.

If the object analyzer 22 is calculating CMI, after receiving the image(s) from the camera system 110, the pool of feature module 24 then calculates a pool of features for each pixel of the plurality of pixels in the image(s). The pool of moment calculator 30 derives a pool of central moment of features from the pool of features. The normalized descriptor module 40 then calculates a normalized descriptor based on the derived pool of central moment of features, as shown in Equation 7.

If the object analyzer 22 is calculating CM, after receiving the image(s) from the camera system 110, the pool of feature module 24 then calculates a pool of features for each pixel of the plurality of pixels in the image(s). The object analyzer 22 calculates an area of the image(s), as well. The pool of moment calculator 30 derives a pool of central moment of features from the pool of features and the calculated area. The normalized descriptor module 40 then calculates a normalized descriptor based on the derived pool of central moment of features and the area of the image(s).

Depending on which of the normalized descriptors (e.g., RM, CMI, CM) is calculated, it has further been determined that in the case of calculating RM, that when the pool of features is isotropic, then the derived pool of radial moments of features is rotation invariant; and, that the deriving of the pool of radial moment of features may be a user-selectable order. Similarly, in the case of calculating CMI, that when the pool of features is isotropic, then the derived pool of central moments of features is also rotation invariant; and, that the deriving of the pool of central moment of features has a fixed order. Likewise, in the case of calculating CM, that the pool of features is isotropic; and, that the deriving of the pool of central moment of features may be a user-selectable order.

In any event, once the normalized descriptor is calculated by the normalized descriptor module 40, then the computer 20 is able to compare the normalized descriptor to a library of images and data so as to one of recognize, detect, and/or categorize the object (or more than one object) in the received image, images, image region, and/or image regions using now known or later developed methodologies.

One skilled in the art of computer science will be able to combine the software created as described with appropriate general purpose or special purpose computer hardware, such as a microprocessor, to create a computer system or computer sub-system embodying embodiments of the invention. An apparatus or system in accordance with embodiments of the invention may be one or more processing systems including, but not limited to, a center processing unit (CPRU), memory, storage devices, communications links and devices, servers, I/O devices, or any subcomponents of one or more processing systems, including software, firmware, hardware or any combination of subset thereof, which include embodiments of the invention.

The computer program product of an embodiment of the invention is executable on a computer system for causing the computer system to perform a method of discovering social networks including a discovery method of the invention. The computer system includes a microprocessor, an input device, a display unit and an interface to either the Internet or a network such as Ethernet, and Intranet. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as floppy disk drive, optical disk drive, etc. The storage device can also be other similar means for loading computer programs or other instructions into the computer system. The computer system also includes a communication unit. The communication unit allows the computer to connect to other database and the Internet through an I/O interface. The communication unit allows the transfer as well as reception of data from other databases. The communication unit may include a modem, an Ethernet card, or any similar device that enables the computer systems to connect to databases and networks such as LAN, MAN, WAN, and the Internet. The computer system facilitates inputs from a user through an input device, accessible to the system through the I/O interface. Various modules may also be in the form of hardware units.

The computer system executes a set of instructions that are stored in one or more storage elements to process input data. The set of instructions may be a program instruction means. The storage elements may also hold data or other information as desired. The storage element may be in the form of an information source or a physical memory present in the processing machine.

The set of instructions may include various commands that instruct the processing machine to perform specific tasks such as the steps that constitute an embodiment of the method of the invention. The set of instructions may be in the form of a software program. Further, the software may be in the form of a collection of separate programs, a program module with a larger program or a portion of a program module. The software may also include modular programming in the form of object-oriented programming. The processing of input data by the processing machine may be in response to user commands, results of previous processing or a request made by another processing machine.

Therefore, according to one embodiment of the present invention, a computerized method for analyzing objects in images, wherein the images are obtained from a camera system, said computerized method comprises: receiving at least one image having a plurality of pixels from the camera system; calculating a pool of features for each pixel of the plurality of pixels; deriving one of: a pool of radial moment of features from the pool of features and a geometric center of the at least one image; and a pool of central moments of features from the pool of features; calculating a normalized descriptor, based on an area of the at least one image and one of the derived pool of radial moment of features and the derived pool of central moments of features; and based on the normalized descriptor, a computer then at least one of: recognizing at least one object in the at least one image; detecting at least one object in the at least one image; and categorizing at least one object in the at least one image.

According to another embodiment of the present invention, a computerized method for analyzing objects in images, wherein the images are obtained from a camera system, said computerized method comprises: receiving at least one image having a plurality of pixels from the camera system; calculating a pool of features for each pixel of the plurality of pixels; deriving a pool of central moments of features from the pool of features; computing a pool of central moment invariants, based on the pool of central moments of features; calculating a normalized descriptor, based on an area of the at least one image and the pool of central moments of features; and based on the normalized descriptor, a computer then at least one of: recognizing at least one object in the at least one image; detecting at least one object in the at least one image; and categorizing at least one object in the at least one image.

According to another embodiment of the present invention, a computer readable medium having computer executable instructions providing a method for analyzing objects in images, wherein the images are obtained from a camera system, said method comprising: receiving at least one image having a plurality of pixels from the camera system; calculating a pool of features for each pixel of the plurality of pixels; deriving one of: a pool of radial moment of features from the pool of features and a geometric center of the at least one image; and a pool of central moments of features from the pool of features; calculating a normalized descriptor, based on an area of the at least one image and one of the derived pool of radial moment of features and the derived pool of central moments of features; and based on the normalized descriptor, at least one of: recognizing at least one object in the at least one image; detecting at least one object in the at least one image; and categorizing at least one object in the at least one image.

According to another embodiment of the present invention, a system for analyzing objects in images, wherein the images are obtained from a camera system, said system comprising: a system for receiving at least one image having a plurality of pixels from the camera system; a system for calculating a pool of features for each pixel of the plurality of pixels; a system for deriving one of: a pool of radial moment of features from the pool of features and a geometric center of the at least one image; and a pool of central moments of features from the pool of features; a system for calculating a normalized descriptor, based on an area of the at least one image and one of the derived pool of radial moment of features and the derived pool of central moments of features; and a system that, based on the normalized descriptor, does at least one of: recognizing at least one object in the at least one image; detecting at least one object in the at least one image; and categorizing at least one object in the at least one image.

The present invention has been described in terms of the preferred embodiment, and it is recognized that equivalents, alternatives, and modifications, aside from those expressly stated, are possible and within the scope of the appending claims.

The invention claimed is:

1. A computerized method for analyzing objects in images, wherein the images are obtained from a camera system, said computerized method comprising:
   receiving at least one image having a plurality of pixels from the camera system;
   calculating a pool of features for each pixel of the plurality of pixels;
   deriving one of:
      a pool of radial moment of features from the pool of features and a geometric center of the at least one image; and
      a pool of central moments of features from the pool of features;
   calculating a normalized descriptor, based on an area of the at least one image and one of the derived pool of radial moment of features and the derived pool of central moments of features; and
   based on the normalized descriptor, a computer then at least one of:
      recognizing at least one object in the at least one image;
      detecting at least one object in the at least one image; and
      categorizing at least one object in the at least one image.

2. The method of claim 1 wherein the at least one object is a vehicle.

3. The method of claim 1, wherein a portion of the camera system includes aerial video equipment.

4. The method of claim 1, further comprising outputting from the computer an identification of one of the recognized object, the detected object, and the categorized object.

5. The method of claim 1, wherein the at least one image comprises an image region.

6. The method of claim 1, wherein the deriving comprises a user-selectable order.

7. The method of claim 1, wherein the pool of features is isotropic.

8. The method of claim 7, further wherein the pool of radial moment of features is rotation invariant.

9. The method of claim 1, wherein the pool of features is anisotropic.

10. A computerized method for analyzing objects in images, wherein the images are obtained from a camera system, said computerized method comprising:
    receiving at least one image having a plurality of pixels from the camera system;
    calculating a pool of features for each pixel of the plurality of pixels;
    deriving a pool of central moments of features from the pool of features;
    computing a pool of central moment invariants, based on the pool of central moments of features;
    calculating a normalized descriptor, based on an area of the at least one image and the pool of central moments of features; and
    based on the normalized descriptor, a computer then at least one of:
       recognizing at least one object in the at least one image;
       detecting at least one object in the at least one image; and
       categorizing at least one object in the at least one image.

11. The method of claim 10, wherein the deriving has a fixed order.

12. The method of claim 10, wherein the at least one image comprises an image region.

13. The method of claim 10, wherein the pool of features is isotropic; and, the pool of central moment invariants is rotation invariant.

14. A non-transitory computer readable medium having computer executable instructions providing a method for analyzing objects in images, wherein the images are obtained from a camera system, said method comprising:
    receiving at least one image having a plurality of pixels from the camera system;
    calculating a pool of features for each pixel of the plurality of pixels;
    deriving one of:
       a pool of radial moment of features from the pool of features and a geometric center of the at least one image; and
       a pool of central moments of features from the pool of features;
    calculating a normalized descriptor, based on an area of the at least one image and one of the derived pool of radial moment of features and the derived pool of central moments of features; and
    based on the normalized descriptor, at least one of:
       recognizing at least one object in the at least one image;
       detecting at least one object in the at least one image; and
       categorizing at least one object in the at least one image.

* * * * *

UNITED STATES PATENT AND TRADEMARK OFFICE
CERTIFICATE OF CORRECTION

PATENT NO. : 7,953,245 B2 Page 1 of 1
APPLICATION NO. : 12/542994
DATED : May 31, 2011
INVENTOR(S) : Doretto et al.

It is certified that error appears in the above-identified patent and that said Letters Patent is hereby corrected as shown below:

On the Title Page, item (56), under "FOREIGN PATENT DOCUMENTS", in Column 2, Line 1, delete "W02006058154" and insert -- WO2006058154 --, therefor.

In Column 4, Line 49, in Equation (1), delete "(I,x,y)," and insert -- (I,x,y). --, therefor.

In Column 4, Line 59, delete " $=\int_\Omega x^p x^q f(x, y) dx dy$ " and insert -- $=\int_\Omega x^p y^q f(x, y) dx dy$ --, therefor.

In Column 8, Line 16, delete "-A(x",y")" and insert -- A(x', y") --, therefor.

Signed and Sealed this
Ninth Day of August, 2011

David J. Kappos
*Director of the United States Patent and Trademark Office*